United States Patent [19]

Day et al.

[11] Patent Number: 5,306,123
[45] Date of Patent: Apr. 26, 1994

[54] NOISE ISOLATING ROTOR FOR AIR HANDLER MOTOR

[75] Inventors: James Day, Scotia, N.Y.; Tariq M. Alkhairy, Ft. Wayne, Ind.

[73] Assignee: General Electric Company, Schenectady, N.Y.

[21] Appl. No.: 43,692

[22] Filed: Apr. 8, 1993

[51] Int. Cl.⁵ ............................................. F04B 17/00
[52] U.S. Cl. ................................... 417/423.7; 310/51
[58] Field of Search ............ 417/423.7, 423.15, 410 R; 310/51

[56] References Cited

U.S. PATENT DOCUMENTS

| | | | |
|---|---|---|---|
| 508,634 | 11/1893 | Priest | 310/51 |
| 4,171,190 | 10/1979 | Hudson | 310/51 |
| 4,471,248 | 9/1984 | Smetana | 310/51 X |
| 4,617,484 | 10/1986 | Buijsen | 310/51 |
| 4,783,608 | 11/1988 | Gruber et al. | 310/51 |
| 5,027,026 | 6/1991 | Mineta et al. | 310/51 |
| 5,044,897 | 9/1991 | Dorman | 417/423.7 |

FOREIGN PATENT DOCUMENTS

| | | | |
|---|---|---|---|
| 0487785 | 6/1992 | European Pat. Off. | 310/51 |
| 1538933 | 3/1970 | Fed. Rep. of Germany | 310/51 |
| 1059329 | 4/1954 | France | 417/423.7 |

Primary Examiner—Richard A. Bertsch
Assistant Examiner—Michael I. Kocharov
Attorney, Agent, or Firm—William H. Pittman

[57] ABSTRACT

A rotor assembly for an air handler motor includes a rotor core and a rotor insert comprising at least two elements fixedly attached to the shaft of the motor. Said rotor elements have non-circular axial outer surfaces which fit in a hole in the rotor core. The inserts are sealed to the core by an elastomeric seal, which functions to prevent axial movement of the rotor core along the shaft, transmit torque and damp vibrations resulting from the magnetic field employed to power the rotor, thus suppressing noise.

4 Claims, 4 Drawing Sheets

NOISE ISOLATING ROTOR FOR AIR HANDLER MOTOR

This invention relates to gas propulsion devices. More particularly, it relates to the construction of air handler motors, and especially the magnetic rotors which are structural elements of such motors.

Gas propulsion devices, especially air handlers, often include at least one motor-driven fan blade, said blade and the motor being located in a duct for passage of air. The fan blade is driven by a shaft propelled by the motor, and its rotation moves air in large quantities through the duct.

One feature of the motor is a magnetic rotor driven by a magnetic field, which causes it to rotate at high speed. A typical rotor has conventionally included a rotor core axially surrounding and fixedly attached to the shaft, with a annular magnet attached to its axial outer surface. It is this magnet which is powered and rotated by the aforementioned magnetic field.

The rotor assembly is typically constructed by placing magnet sections around the cylindrical rotor core, installing the end plates, inserting the shaft and placing the entire assembly in a centering device which holds it in the requisite configuration. The end plates are then secured to the magnet and core by conventional means such as welding. Since no magnet element employed in such a rotor is perfectly cylindrical in shape and of precise and predetermined thickness, the area of overlap between the end plates and the rotor core and magnets will not be perfectly symmetrical. As one result, the welds attaching the plates to the core and magnets, which have a continual shearing force imparted thereto, tend to fail with continued operation of the rotor.

Another problem with operation of air handler motors is the result of vibration caused by the high-frequency magnetic field generated therein. Such vibration is transmitted through the motor shaft and the air ducts, causing an unacceptable level of noise.

Therefore, it would be of interest to develop a gas handling motor and particularly a rotor construction therein with increased structural stability and decreased tendency to transmit noise produced by magnetic vibration. This is achieved by the present invention.

In one of its aspects, the invention is a motor rotor assembly comprising:
a rotatable shaft; and
a rotor fixedly attached to and adapted to drive said shaft, said rotor comprising:
a rotor insert comprising at least two portions fixedly attached to said shaft and having non-circular axial outer surfaces;
a rotor core axially surrounding said rotor insert, said rotor core having a cylindrical axial outer surface and a non-circular axial hole therein to accommodate said rotor insert;
a cylindrical magnet attached to the axial outer surface of said rotor core; and
means to prevent axial movement of said rotor core along said shaft, said means including a vibration-damping elastomeric seal securing said rotor core to said rotor insert.

In the drawings:
FIGS. 1 and 2 are a cross-sectional and an axial end view, respectively, of a preferred embodiment of a rotor according to the present invention.

Figure 1:
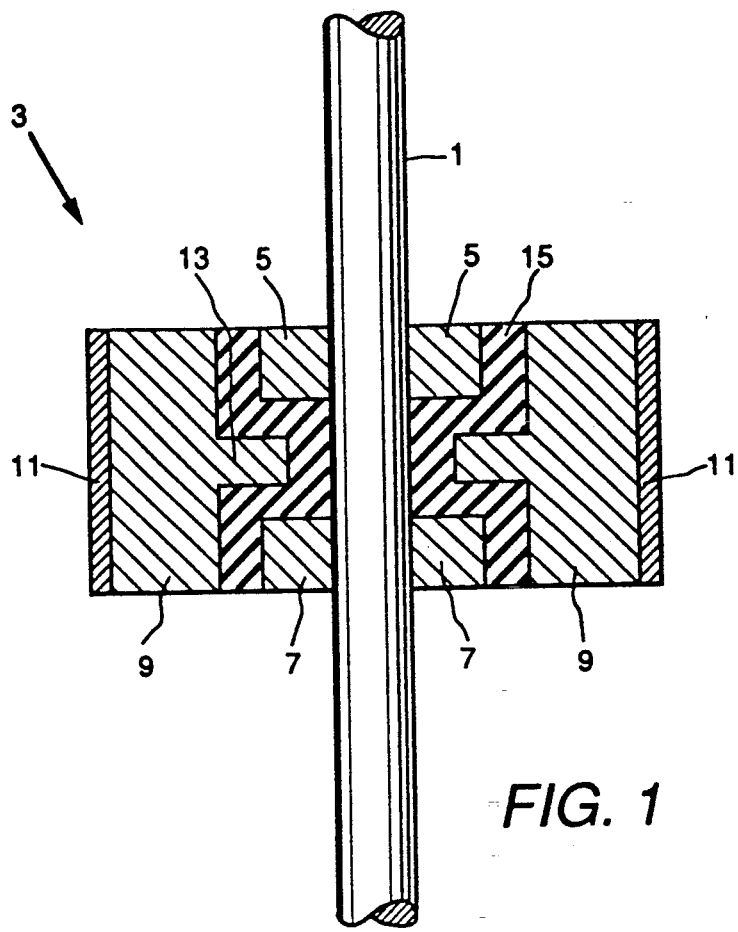
Figure 2:
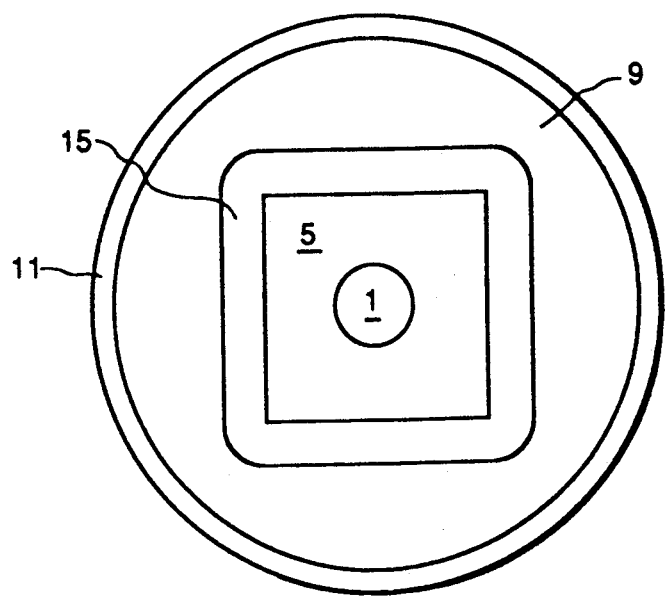

Reference is now made to FIGS. 1 and 2 in which rotatable shaft 1 passes through and is fixedly attached, as by welding, to rotor inserts 5 and 7 of rotor 3. Said rotor elements are depicted as being square in configuration; however, those skilled in the art will recognize that they may be of any other non-circular shape such as rectangular, elliptical or hexagonal.

Rotor core 9 axially surrounds shaft 1 and rotor inserts 5 and 7. Said rotor core has a cylindrical axial outer surface and a non-circular (e.g., square) axial hole therein. Said hole is sized so as to accommodate rotor inserts 5 and 7 and to enable rotor core 9 to impart torque to said rotor inserts even in the absence of elastomeric seal 15, as described hereinafter. Cylindrical magnet 11, of any suitable ferromagnetic material, is attached to the outer surface of rotor core 9 by conventional attachment means.

Another feature of rotor core 9 is projection 13 located axially between rotor inserts 5 and 7, which prevents axial movement of said rotor core along shaft 1. As pictured, projection 13 extends beyond the outer edges of rotor insert portions 5 and 7 toward shaft 1, providing a physical barrier to axial movement of the rotor core. However, it is also within the scope of the invention for projection 13 to stop short of the edges of rotor inserts 5 and 7, and for axial movement to be prevented solely by the elastomeric filler material providing a seal.

Said elastomeric seal, designated 15, may be any conventional elastomeric material such as a silicone or polyurethane elastomer. In the finished form of the rotor, it is fully cured. It serves several purposes: centering of the assembly including shaft 1 and rotor inserts 5 and 7 within rotor core 9, transmitting torque from said rotor core to said shaft, preventing axial movement of said shaft and rotor inserts relative to said rotor core, and damping and isolation of vibrations created by the action of the magnetic field on magnet 11 and rotor core 9.

For a rotor with an outer diameter of about 75-80 mm., an approximately 50-55 mm. square rotor insert is typical. The distance between projection 13 and shaft 1, as well as between rotor inserts 5 and 7 and rotor core 9, may be about 5-10 mm.

Figure 3:
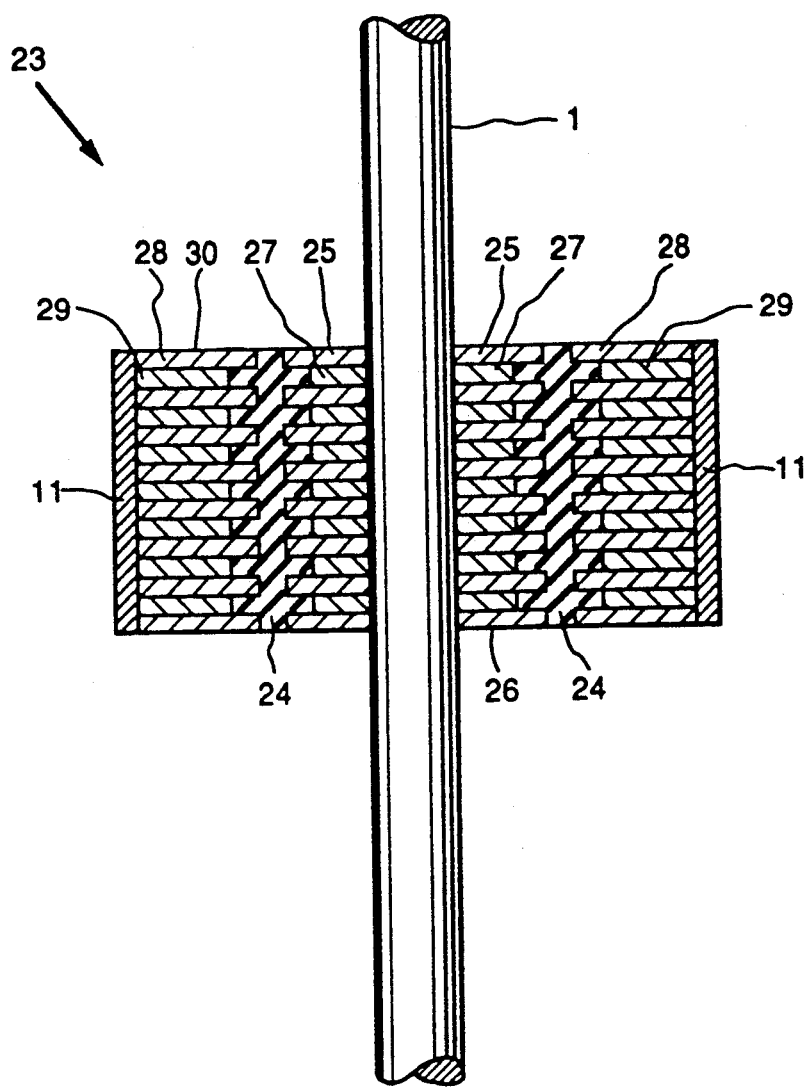
FIG. 3 is a cross-sectional view of another embodiment.

Another embodiment of the invention is shown in FIG. 3, in which like numbers represent elements similar to those in FIGS. 1 and 2. The rotor, designated 23, has a rotor core 30 formed of a plurality of laminated portions of which two are designated 28 and 29, with staggered edges. Said laminations provide a tooth-like inner configuration. The rotor insert, designated 26, comprises a similar plurality of laminated portions of which two are designated 25 and 27, similarly configured in such a way that the entire rotor insert is within the boundaries of the hole in the rotor with about 5-15 mm. separating the two. All of said laminated portions in said rotor insert and rotor core, respectively, are fixedly connected, for example by welding.

The movement-preventing means in this embodiment essentially consists solely of elastomeric seal 24, which is similar to the corresponding elastomeric seal in FIGS. 1 and 2.

The elements of the present invention other than the magnet and elastomeric seal are constructed of conventional material, generally metal and typically steel.

Figure 4:
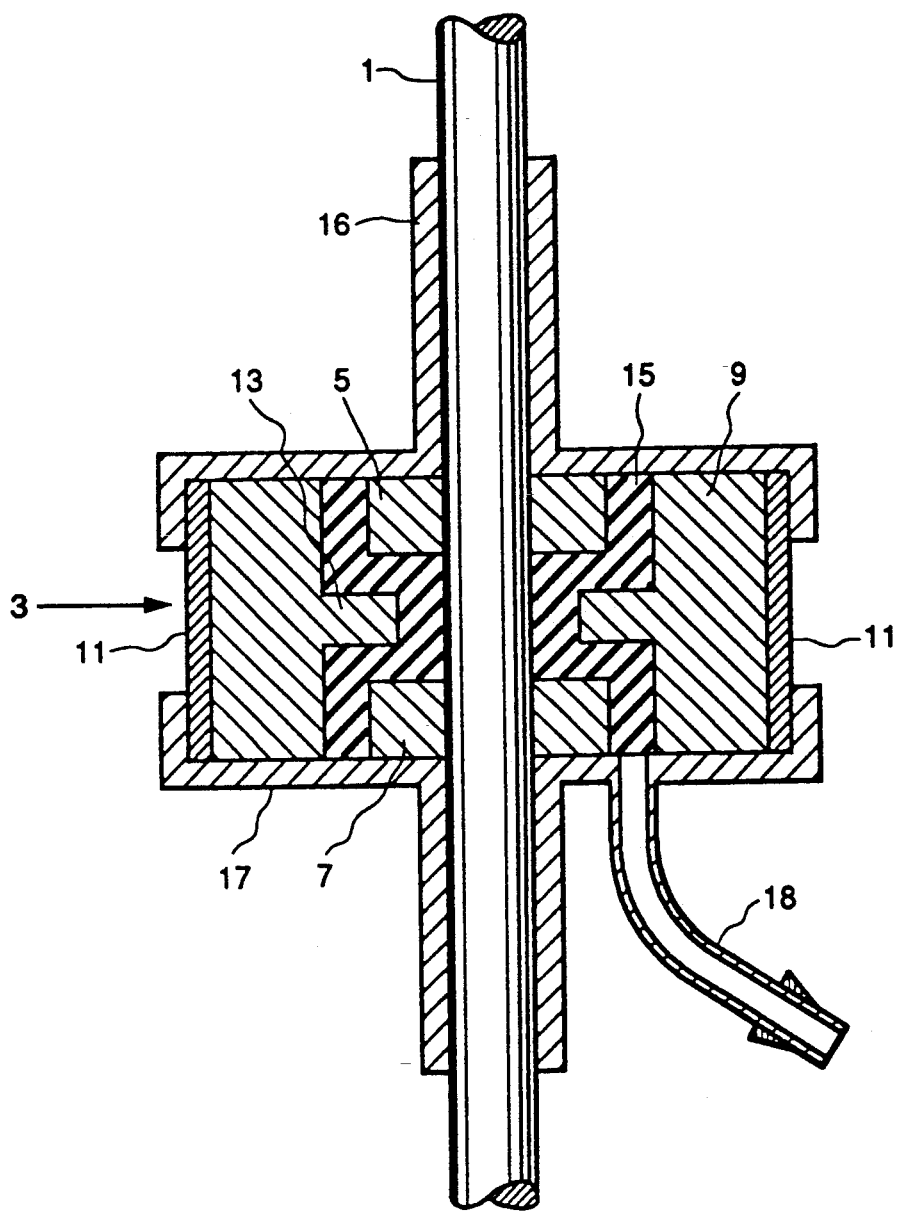
FIG. 4 is a cross-sectional view of the rotor of the first embodiment, installed in a centering device therefor as described hereinafter.

FIG. 4 illustrates a means for aligning and centering the elements of rotor assembly 3 of FIG. 1, employing centering elements 16 and 17. Typically, centering 17 and rotor insert 7 are first placed on shaft 1, followed by rotor core 9 with magnet 11 attached thereto. Next, rotor insert 5 is placed on shaft 1 with adequate interference fit so that there is no relative motion between said shaft and insert. Centering element 16 is finally placed on the entire assembly, and together with similar element 17 locates the various parts in the proper configuration for fixed attachment.

Uncured elastomeric material is then pumped into the assembly via conduit 18. Said conduit is pictured as being a part of centering element 17, but those skilled in the art will recognize that it could equally well be a part of centering element 16. When the space to be occupied by said elastomeric seal material is completely filled, the elastomer is allowed to cure and centering elements 16 and 17 are removed, whereupon assembly is complete.

The rotor thus produced is used conventionally as a part of a motor for a gas propulsion device. Another aspect of the invention, therefore, is a motor assembly for an air handler, comprising:

a duct for passage of gas, and, located in said duct:
rotatable gas propulsion means, typically a fan blade:
a rotatable shaft driving said gas propulsion means; and
the aforementioned rotor comprising a rotor insert, a rotor core, a cylindrical magnet and means to prevent axial movement of said rotor core.

Figure 5:
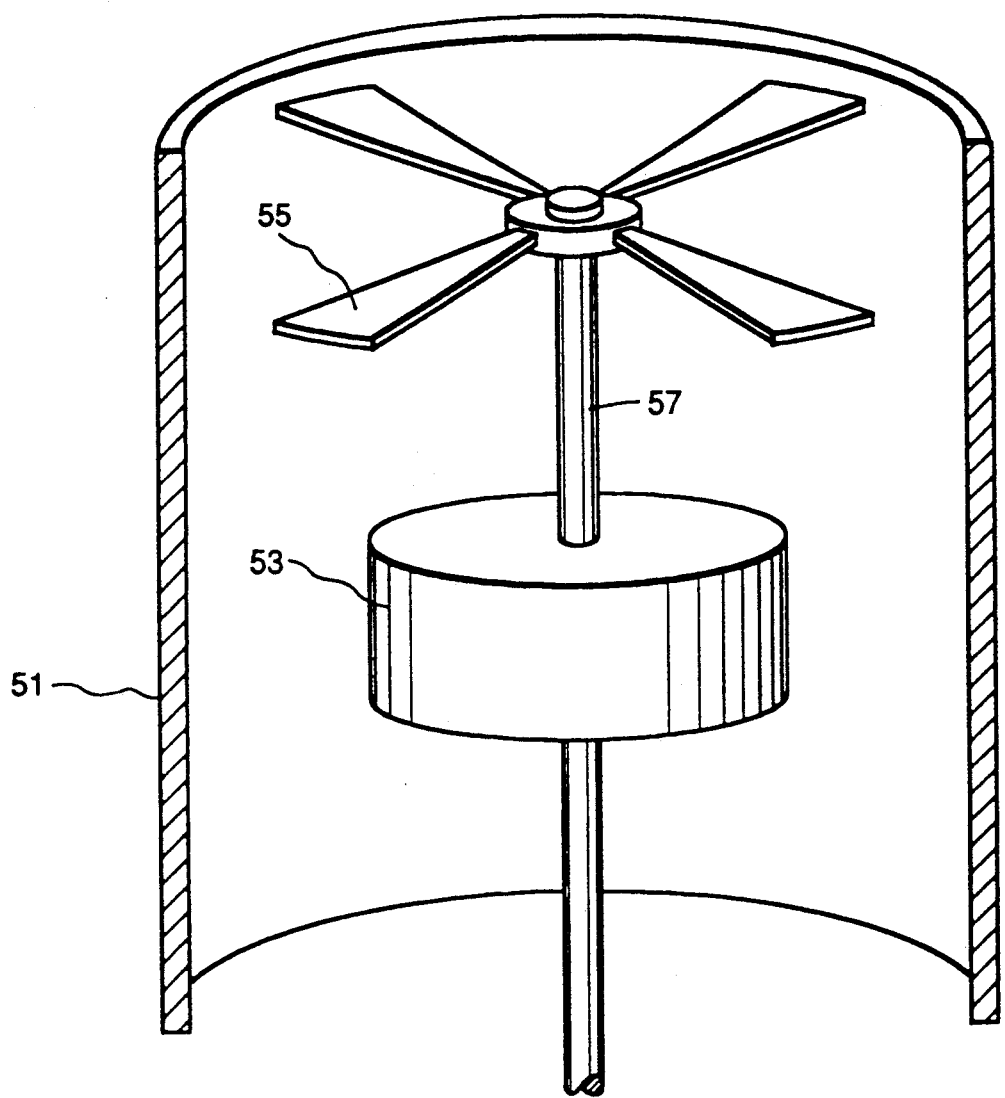
FIG. 5 is a cross-sectional view of an air handler containing the motor rotor assembly of the invention.

Such an assembly is shown in FIG. 5. It includes duct 51 in which motor 53, comprising a rotor assembly according to the invention, is mounted. Motor 53 drives fan blade 55 via shaft 57.

In operation, magnet 11 is caused to rotate by the magnetic field imparted thereto. It in turn drives rotor core 9 and the rotor inserts, which are fitted into the hole in rotor core 9 in such a way that they would receive the torque from the rotor inserts even in the absence of elastomeric seal 15. Said seal adheres to proximate surfaces and maintains their proper spacing and attitude, and serves as a damping means for vibrations caused by the magnetic field, preventing the transmission of said vibrations through shaft 1 to the fan blade and gas passage duct.

While the invention has been described with reference to air handlers and their motors, those skilled in the art will recognize that it may likewise be employed with apparatus for the propulsion of other gases.

What is claimed is:

1. A motor assembly for an air handler, comprising:
a duct for passage of gas, and, located in said duct:
rotatable gas propulsion means;
a rotatable shaft driving said gas propulsion means; and
a rotor fixedly attached to and adapted to drive said shaft;
said rotor comprising:
a rotor insert fixedly attached to said shaft and having non-circular axial outer surfaces, said rotor insert comprising a plurality of laminated portions with staggered edges;
a rotor core axially surrounding said rotor insert, having a cylindrical axial outer surface and a non-circular axial hole therein to accommodate said rotor insert, said rotor core comprising a plurality of laminated portions with staggered edges;
a cylindrical magnet attached to the axial outer surface of said rotor core; and
means to prevent axial movement of said rotor core along said shaft, said means including a vibration-damping elastomeric seal securing said rotor core to said rotor insert.

2. A motor assembly according to claim 1 wherein the rotor insert portions have square axial outer surfaces and the hole in the rotor core is square.

3. A motor rotor assembly comprising:
a rotatable shaft; and
a rotor fixedly attached to and adapted to drive said shaft, said rotor comprising:
a rotor insert fixedly attached to said shaft and having non-circular axial outer surfaces, said rotor insert comprising a plurality of laminated portions with staggered edges;
a rotor core axially surrounding said rotor insert, having a cylindrical axial outer surface and a non-circular axial hole therein to accommodate said rotor insert, said rotor core comprising a plurality of laminated portions with staggered edges;
a cylindrical magnet attached to the axial outer surface of said rotor core; and
means to prevent axial movement of said rotor core along said shaft, said means including a vibration-damping elastomeric seal securing said rotor core to said rotor insert.

4. A rotor assembly according to claim 3 wherein the rotor insert portions have square axial outer surfaces and the hole in the rotor core is square.

* * * * *